United States Patent Office 3,399,186
Patented Aug. 27, 1968

3,399,186
CATIONIC METAL-CONTAINING AZO DYES FROM 8-HYDROXYQUINOLINE
Kenjiro Hosokawa, Osaka, Yasushi Kojima, Hirakata, and Motoo Mori and Masaaki Suzuki, Osaka, Japan, assignors to Kanegafuchi Spinning Co., Ltd., Tokyo, Japan
No Drawing. Original application Jan. 17, 1963, Ser. No. 252,026. Divided and this application Aug. 16, 1965, Ser. No. 480,100
Claims priority, application Japan, Jan. 24, 1962, 37/2,670; Oct. 23, 1962, 37/47,467
8 Claims. (Cl. 260—148)

ABSTRACT OF THE DISCLOSURE

Water-soluble metal-containing cationic dyestuffs are made by reacting dyes having either —COOH and —OH groups in ortho position with respect to one another in the molecule or dyes having —CHNOH and —OH groups, similarly located, with from 1 to 4 moles per mole of starting dye, of a metal compound that has trivalent or tetravalent titanium, or tetravalent zirconium, or, most importantly, trivalent chromium, and possesses a basicity lower than 33.3 percent, the reaction medium being an organic solvent that is a solvent for both the starting dye and the metallized dye product and is at least partially miscible wtih water, the pH of the reaction being below 4. The starting dyes disclosed are unsulfonated and are mostly monoazo though some disazo and triaryl-methane dyes are shown. The metallized dyestuffs are suitable for dyeing a large variety of substances using conventional methods since they are stable against thermal decomposition.

---

The present application is a division of copending application, Ser. No. 252,026, filed Jan. 17, 1963, and now abandoned.

This invention relates to novel metal-containing dyestuffs, a method of producing same and a dyeing process utilizing said dyestuffs. More particularly, the invention relates to novel cationic metal-containing dyestuffs which differ substantially in various properties from the conventional metal-containing dyestuffs, and a method of producing the same. To be more particular, the invention relates to novel metal-containing dyestuffs useful for dyeing various fibers such as synthetic fibers, semi-synthetic fibers, regenerated cellulose fibers, natural fibers, mineral fibers and the like, any suitable mixtures or blends thereof, and their products (e.g. yarn, fabrics, clothings, etc.), examples of the above-mentioned fibers including those of polyester, polyamide, polyurea, polyacrylonitrile, polyvinyl chloride, polyvinyl alcohol, polyacetate, polypropylene, polyoxymethylene, polyethylene, viscose, cuprammonium rayon, silk, wool, cotton, linen as well as leather and glass.

With certain exceptions, fibers carry negative surface charges in a dye bath, and in the case of the so-called difficultly dyeable synthetic fibers such as polyester and polypropylene fibers, this tendency is so pronounced that with most anionic dyestuffs, it is almost impossible to dye these fibers owing to static problems. Furthermore, the conventional cationic dyestuffs or non-ionic dispersion dyestuffs which are employed to overcome the above-mentioned difficulties have disadvantages with respect to their fastness, particularly their wet color fastness, sublimation fastness, and resistance to dry cleaning.

In this connection, it is further to be understood that the development of mixtures or blends of synthetic and natural fibers has complicated dyeing procedures to such an extent that a plurality of processes have to be actually employed to dye such mixed fibers or products thereof utilizing many different types of dyestuffs in various combinations according to the mode of mixture and the variety of fibers used.

We have found that a novel water-soluble metal-containing cationic dyestuff is obtained when (1) a dyestuff having —COOH and —OH groups in ortho-position with respect to one another in the molecule, or (2) a dyestuff having —CHNOH and —OH groups in ortho-position with respect to one another in the molecule, is reacted with a trivalent-chromium compound, a tetravalent-zirconium compound, or a trivalent- or tetravalent-titanium compound in a suitable solvent, and that the dyestuffs thus obtained may advantageously be employed for satisfactorily dyeing various fibers and products such as mentioned before.

There have heretofore been known a number of metal-containing dyestuffs which are typically exemplified by the following chemical structures:

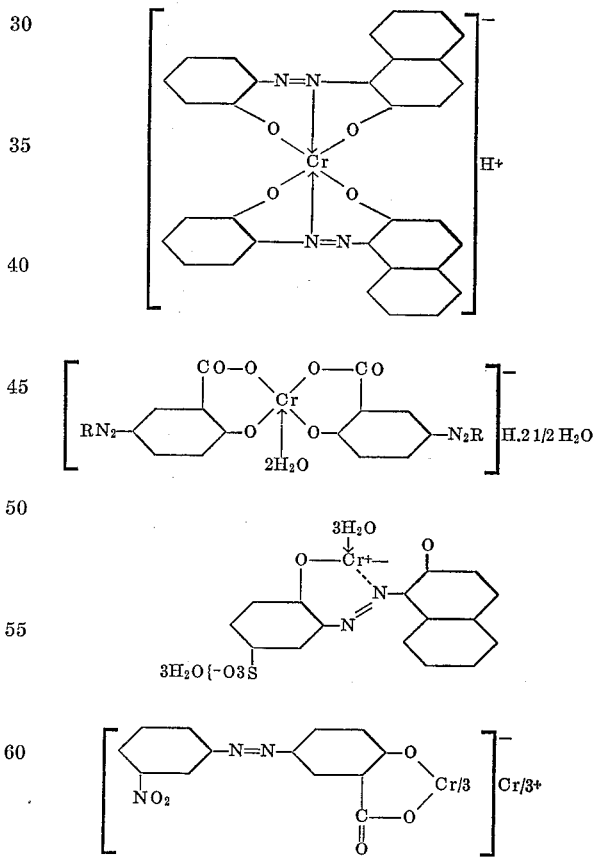

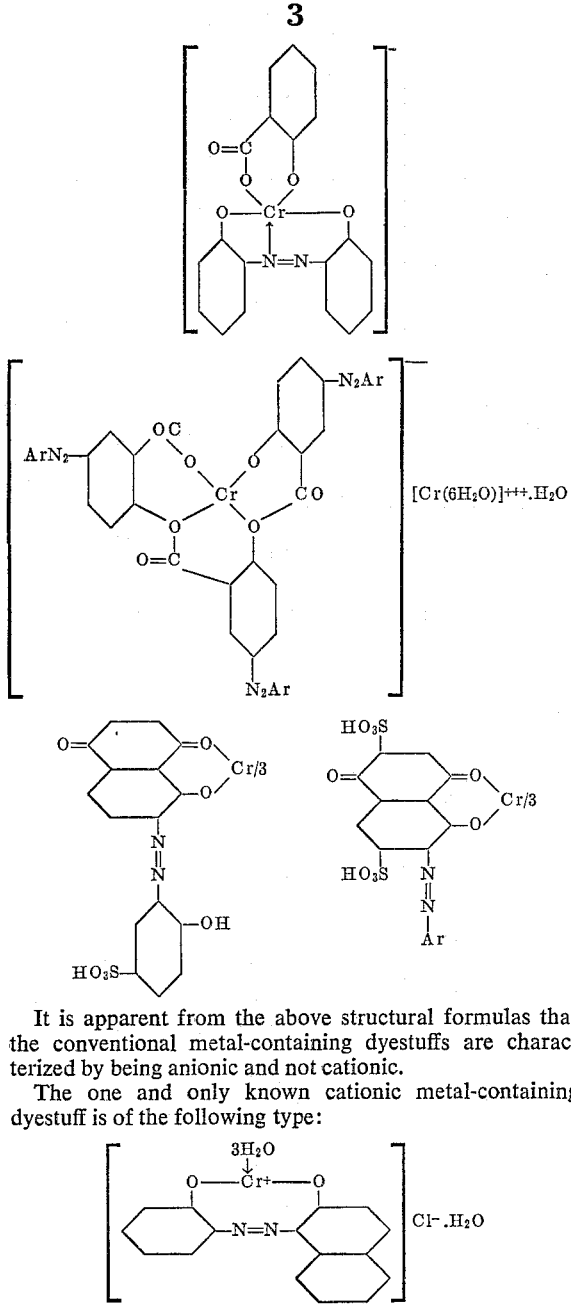

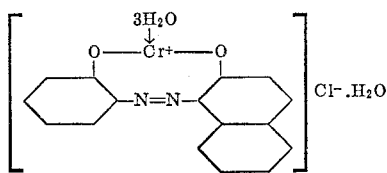

It is apparent from the above structural formulas that the conventional metal-containing dyestuffs are characterized by being anionic and not cationic.

The one and only known cationic metal-containing dyestuff is of the following type:

While this type of dyestuff may be synthesized by heating an alcoholic solution of o-hydroxybenzene-azo-β-naphthol together with chromium chloride, it is so unstable against heating in an aqueous solution that precipitation occurs. Therefore, this substance is not satisfactory for use as a dyestuff.

The dyestuffs of the invention are entirely different from the conventional metal-containing dyestuffs in that they are water-soluble, cationic and stable.

It is noteworthy that the compounds which are the starting materials to be used in the manufacture of the dyestuffs of the invention, have never been used as materials for the conventional metal-containing dyestuffs, and that the synthesis of the metal-containing dyestuffs according to this invention is essentially conducted in a non-aqueous solvent in sharp contrast to the conventional process where water is used as the solvent. It is presumably because of the use of these special starting materials and of the novel, unique manufacturing conditions that the dyestuff of the invention produced thereunder possesses the novel, unique characteristics which have hereinbefore been described and will more fully be explained and discussed hereinafter.

In practicing the invention, the starting material dyestuffs exemplified below may be employed:

Examples of those belonging to the Group 1:

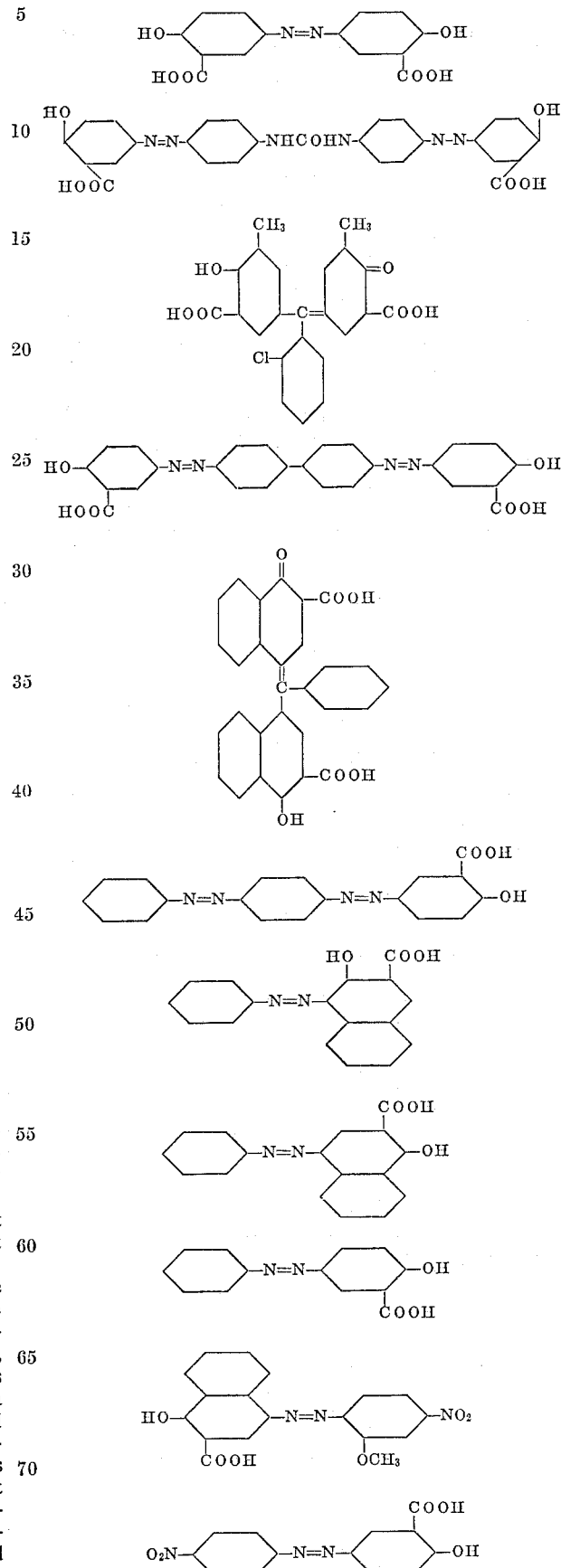

Examples of those belonging to Group 2:

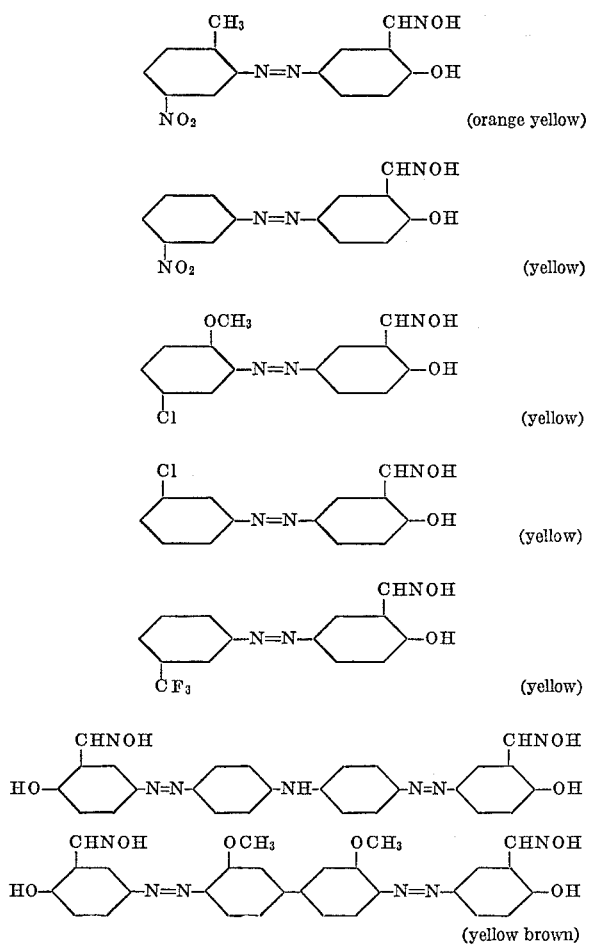

The above-mentioned starting materials may be employed in the form of water-soluble metallic salts such as sodium salts, potassium salts, etc.

The metal compounds which are used in the synthesis of the dyestuffs of the invention by reacting with the aforementioned starting material dyestuffs are preferably compounds of trivalent or tetravalent chromium, titanium, or zirconium which would show acidity, such compounds being exemplified by titanium trichloride, titanium tetrachloride, zirconium oxychloride, chromium chloride, chromium fluoride, chromium formate, etc. Among those salts mentioned above, green crystals of chromium chloride are particularly preferred.

The basicity of the aforementioned metal compounds has to be lower than 50 percent, and preferably lower than 33.3 percent.

The reaction should be conducted in an acidic condition or at a pH below 4 (preferably below 2). Most of the above metal compounds when dissolved in a solvent exhibit a pH below 4. If necessary, however, a suitable acid may be added to the solution to adjust its pH to a preferable one.

The amount of these metal compounds may vary depending on the particular chemical structure of the starting material dyestuff employed. Generally, the use of the metal compound is an amount within the range of 1 to 4 moles per mole of the starting material is most satisfactory in view of the quality of the resulting dyestuff as well as from economic considerations. It should be understood, however, that the use of more than 4 moles of said compound will not adversely affect the yield and quality of the final product.

Preferred amount of the metal compounds with respect to the starting material dyestuffs belonging to Groups 1 and 2 will be illustrated below with chromium taken as an example.

Functional radical:      Chromium (in mole per one functional radical)
(1) —COOH and —OH in o-position with respect to one another _____ 2
(2) —CHNOH and —OH in o-position with respect to one another _____ 2

When a chromium compound is employed in an amount less than the number of moles given in the table, the resulting dyestuffs will be unstable and, in many cases, insoluble in water. The use of an excess of the metal will not produce objectionable results but, rather, may serve to accelerate the reaction. However, the practical limitation is that at best up to 4 moles of such metal per each functional group may be employed.

The solvent to be employed in the reaction of the invention has to satisfy the following requirements: (a) It should be capable of dissolving both the starting material or dye and metal compound, (b) it should not exhibit alkalinity, and (c) it has to be at least partially miscible with water. While a number of solvents satisfy such requirements, the most commonly available of such solvents include, for example, alcohols, glycols and ketones, and, more particularly, methanol, ethanol, isopropanol, n-propanol, ethylene glycol, polyethylene and the like. The organic solvent utilized is inert with respect to the starting material or dye and metal compound. Although, as a rule, water is not allowed to be present in the organic solvent at the commencement of the reaction, it may sometimes be advantageous that the solvent contains a small amount, e.g. up to 20% (based on solvent) of water in order to increase the basicity of the metal compound used and to enable the reaction to proceed more readily. Particularly, in many instances, water of crystallization contained essentially in the metal compound serves to accelerate the reaction of the invention.

The reaction time and temperature should vary according to the particular starting material dyestuff and, also, of metal compound, although, in many instances, the temperature range of 50° C. to 150° C., and, more commonly, up to 100° C. will be satisfactory. In most cases the reaction is completed within about one hour.

The dyestuffs manufactured by the process described hereinbefore exhibit cationic property in the reaction system and also in water, with the number of metal atoms combined to one molecule of the dyestuff being from 1 to 4.

The solids which remain after the solvent is distilled off subsequent to the reaction may be put to use as such. Since the optimum molar ratios of the starting material dyestuff to the metal compound are as described above, and there would remain none unreacted so long as such ratios are strictly adhered to, the solution resulting from the reaction can be directly used for dyeing purposes without isolating the product dyestuff therefrom. Furthermore, some products (some of those dyestuffs which are obtained when titanium or zirconium is employed), once the solvent is completely distilled off, will not dissolve themselves completely in water. If such is the case, it will then be more advantageous to allow a part of the solvent to remain after distillation and put the product to use as a pasty dyestuff. While what might be obtained as by-products, in many instances, would be a trace amount of water or hydrochloric acid, neither of them would cause trouble in the actual use of the product dyestuffs. Where the functional group is —COOH, and if a material containing —COONa is employed in such case, NaCl will be formed as a by-product, which, however, may be easily removed by filtration before the solvent is distilled off.

Hereinafter will be set forth an explanation about the dyeing process utilizing the novel cationic dyestuffs of the invention. While the pH of a dyestuff solution varies according to the type of the metal compound employed, it will show, for instance, a pH value ranging from 1 to 4.5 in water where crystalline chromium chloride is employed as the metal compound. In this instance, it is presumed that the cationic surface activity of the dyestuff overcomes the highly negative charge on the surface of fibers, thereby sufficiently penetrating into the fibers, where the dye is fixed onto the fibers through coordination bond, covalent bond, condensation, or/and insolubilization.

The dyestuffs of the invention may be applied to substrates in any conventional manner, i.e. by dipping, padding, coating, printing and the like. The substrates dyeable with the dyestuffs of the invention include, for instance, all the conventional easy-to-dye fibers, polyester fibers which are generally considered difficulty dyeable, and even fibers of polypropylene which has no active sites. In all cases, the said fibers are dyed vivid, fast colors. Moreover, except glass, most substrates can be successfully dyed with the dyestuff of this invention at a temperature below 100° C., and this fact is particularly beneficial when fibers vulnerable to heat, e.g. polypropylene, are to be dyed. It is to be understood, however, that no substantial trouble will be encountered if fibers are treated at a temperature beyond 100° C. in the dyeing treatment. On the other hand, in the case of cellulosic fibers and silk, satisfactory results may be obtained even when such fibers are dyed in the neighborhood of room temperature, and particularly with silk, this is quite beneficial in so far as it helps silk retain its unique hand. As regards glass it is preferably dyed in the neighborhood of 140° C., under dry conditions.

Among the dyestuffs of the invention are those which, after having been adsorbed on fibrous substrates, are improved in the fixation and/or wet color-fastness upon treatment with an acid binding agent or subsequent heat-treatment. However, these treatments are not always necessary for all the dyestuffs of the invention. Preferred examples of the acid binding agent include caustic alkali, alkali metal salts of, for example, carbonic acid, silicic acid, acetic acid, phosphoric acid, etc., and those alkalis (e.g. bicarbonates) which yield said alkali metal salts when heated. The inclusion of electrolytes such as sodium sulfate, sodium chloride and the like in an aqueous solution of the acid binding agent does not adversely affect the result of dyeing.

It should be appreciated that many of the novel dyestuffs of the invention may be employed in a single dyeing bath for dyeing various combination fabrics such as those containing natural or regenerated cellulose fibers on one hand and synthetic fibers on the other.

There are, of course, more or less variations in dyeing properties among the novel cationic dyestuffs according to the chemical structures of the respective starting materials, and, therefore, all the dyestuffs of the invention may not be expected to possess the same dyeing properties with respect to all textile fibers. However, it has been found that in a number of instances, by selecting suitable conditions, many kinds of combination or blended fabrics can be dyed in a single dyeing bath, and that, as will hereinafter be described in further detail, particularly satisfactory results may be attained in printing.

The printing process of the invention comprises printing a fabric with a printing paste containing one of the dyestuffs of the invention, drying the printed fabric, subjecting the same, then, to heating or steaming at a temperature around 100° C. or, if required, at a temperature higher than 100° C. but not exceeding 240° C., and, if required, reacting the fabric with an acid binding agent in an aqueous medium, it being understood that the last-mentioned treatment may be conducted either before or after said heat treatment.

The printing paste may contain usual assistant agents such as alcohol and glycol and/or organic acid such as acetic acid. As regards the thickening agent, locust bean type or etherified cellulose, for instance, may successfully be employed. Thus, in the examples given hereinafter to illustrate the invention, Indarcca A/3v (a locust bean type paste thickener) and Tylose DKL (an etherified cellulose type paste thickener) were employed.

Generally, the wet fastness (washing fastness and potting fastness) of the articles dyed according to the invention is improved by conventional soaping.

Moreover, the articles dyed according to this invention have an excellent degree of fastness also to sublimation and dry cleaning.

This invention will be described in greater detail by reference to the following examples.

Example 1

In 2000 parts of isopropanol was dissolved 50 parts of a starting material dyestuff having the following formula:

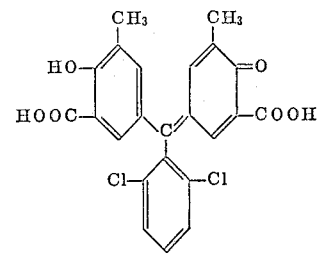

To the resulting solution was added 53 parts of crystalline chromium chloride (27.3% basicity) and the mixture was boiled. As the reaction proceeded the mixture showed a change in color from orange red to blue. At the end of 3 hours, the solvent was distilled off, whereupon 99 parts of a dark violet dyestuff having a metallic luster was obtained. This dyestuff developed a blue color upon dissolution in water and had a maximum absorption at 585 m$\mu$. A 0.1% solution of the dyestuff was passed columnwise over ion exchange resins. The results, as tabulated below, showed that the dyestuff obtained above was cationic.

|  | Solvent | |
| --- | --- | --- |
|  | Methanol | Water |
| Penetrating power: | | |
| Original dye solution | 51.0 | 34.9 |
| After passage through anion exchange resin | 51.4 | 40.8 |
| After passage through cation exchange resin | 97.1 | 99.0 |
| Wavelength: 585 m$\mu$ | | |

Similar results were obtained when acetone or ethylene glycol was used as the reaction solvent. About the same results were also obtained when 1800 parts of methanol and 200 parts of water were employed as a mixed solvent.

Example 2

To a solution of 34.6 parts of a substance having the following formula:

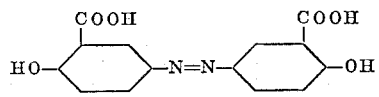

in 2500 parts of methanol was added 360 parts of a 10% solution of titanium trichloride and the mixture was boiled for 6 hours, at the end of which time a part of the solvent was distilled off to yield 400 parts of a concentrate. This concentrate developed a yellowish color upon dissolution in water and had a maximum absorption at 375 m$\mu$. It was found that various kinds of textile fibers could be dyed with this product.

Cationic dyestuffs were obtained when the following starting material dyestuffs were treated in a manner similar to above.

| Example No. | Starting material dyestuff | Type of Metal | Shade of dye solution |
|---|---|---|---|
| 3 | HO–⟨⟩–N=N–⟨⟩–OH with HOOC and COOH | Cr | Yellow. |
| 4 | ⟨⟩–N=N–⟨⟨⟩⟩ with HO, COOH | Cr | Red. |
| 5 | ⟨⟩–N=N–⟨⟨⟩⟩ with COOH, OH | Cr | Yellowish brown. |
| 6 | $O_2N$–⟨⟩–N=N–⟨⟩–OH with COOH | Cr | Yellow. |
| 7 | ⟨⟩–N=N–⟨⟩–OH with COOH | Cr | Do. |
| 8 | HO–⟨⟨⟩⟩–N=N–⟨⟩–$NO_2$ with Cl, $OCH_3$ | Cr | Maroon. |
| 9 | ⟨⟩–N=N–⟨⟩–N=N–⟨⟩–OH with COOH | Cr | Orange. |
| 10 | HO–⟨⟩–N=N–⟨⟩–⟨⟩–N=N–⟨⟩–OH with COOH, COOH | Cr | Yellow. |
| 11 | HO–⟨⟩–N=N–⟨⟩–NHCOHN–⟨⟩–N=N–⟨⟩–OH with COOH, COOH | Cr | Do. |
| 12 | (anthraquinone-type structure with COOH, COOH, OH) | Cr | Green. |
| 13 | HO–⟨⟩–N=N–⟨⟩–OH with COOH, COOH | Ti | Yellow. |

Example 14

To a solution of 34.6 parts of a substance having the following formula:

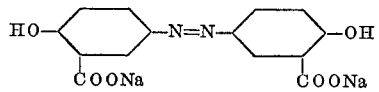

in 1800 parts of ethanol was added 53.3 parts of crystalline chromium chloride (3.7% basicity), and the mixture was boiled for 7 hours. The insoluble by-products such as sodium chloride were then filtered off and the solvent distilled off, whereupon 81 parts of a glossy black violet dyestuff was obtained. This dyestuff developed a yellowish color upon dissolution in water and had a maximum absorption at 370 m$\mu$. It also exhibited cationic property. The dyestuff was well adsorbed on various fibers and the dyed fibers were found particularly excellent in light fastness.

Example 15

To a solution of 6.9 parts (1/20 mole) of salicylaldoxime and 7.8 parts (3/40 mole) of sodium carbonic anhydride in 350 parts of water was added 1/20 mole of diazotized 5-nitro-o-toluidene to effect coupling, which yielded 14.1 parts of a yellow substance. After the product was purified with water and, then, methanol, and 2 parts of the purified product was dissolved in 50 parts of n-propanol, to which 4 parts of crystalline chromium chloride (27.3% basicity) was added, and the mixture was boiled for 10 hours, at the end of which time the solvent was distilled off, whereupon 5.8 parts of a green black dyestuff was obtained. This dyestuff developed an orange yellow color upon being dissolved in water and had a maximum absorption at 470 m$\mu$. This dyestuff was also cationic when tested in the manner described in Example 1.

Cationic dyestuffs were likewise obtained from the following starting material dyestuffs.

Dyeing Example 1

This example shows dyeing of polyoxymethylene and polypropylene fibers.

The said fibers were immersed in a bath containing a solution of 0.2 part of each of the cationic dyestuffs manufactured by metal-complexing the following starting material dyestuffs respectively. The bath temperature was increased to and maintained at 90° C. for 1 hour, at the end of which time the fibers were washed with water and, then, soaped. The dyed fibers were found excellent in wet color fastness, fastness to sublimation, and resistance to dry cleaning.

| Example No. | Starting material dyestuff | Type of metal | Shade of dye solution |
|---|---|---|---|
| 16 | (structure: NO₂-C₆H₃-N=N-C₆H₃(CHNOH)-OH) | Cr | Yellow. |
| 17 | (structure: Cl-C₆H₃-N=N-C₆H₃(CHNOH)-OH) | Cr | Do. |
| 18 | (structure: CF₃-C₆H₃-N=N-C₆H₃(CHNOH)-OH) | Cr | Do. |
| 19 | (structure: HO-C₆H₃(CHNOH)-N=N-C₆H₄-NH-C₆H₄-N=N-C₆H₃(CHNOH)-OH) | Cr | Yellowish brown. |
| 20 | (structure: HO-C₆H₃(CHNOH)-N=N-C₆H₃(OCH₃)-C₆H₃(OCH₃)-N=N-C₆H₃(CHNOH)-OH) | Cr | Do. |
| 21 | (structure: NO₂,CH₃-C₆H₂-N=N-C₆H₃(CHNOH)-OH) | Zr | Yellow. |

| Dye No. | Starting material dyestuff | Type of metal | Shade of dyed material |
|---|---|---|---|
| 1 | (structure: NaOOC-C₆H₂(CH₃)(HO)-C(=C₆H₂(CH₃)(=O)-COONa)-C₆H₃Cl₂) | Cr | Blue. |
| 2 | (structure: HO-C₆H₃(COONa)-N=N-C₆H₃(COONa)-OH) | Ti | Yellow. |
| 3 | (structure: NO₂-C₆H₃(CH₃)-N=N-C₆H₃(CHNOH)-OH) | Cr | Orange yellow. |

Dyeing Example 2

This example illustrates dyeing of mixed cotton-polypropylene fabrics.

In a bath containing a solution of 0.1 part of each of the following dyestuffs in 300 parts of water were immersed 10 parts of a sample of the above-mentioned refined, bleached and mercerized mixed fabric (50:50). The bath temperature was held at 90° C. for 1 hour, at the end of which time the fabric was washed with water and, then, soaped. The fabric was uniformly dyed, and was found excellent in wet color-fastness and color-fastness to sublimation, dry cleaning and friction.

A dyeing paste of the following composition was employed:

| | Parts |
|---|---|
| Dyestuff of the invention (see below) | 3 |
| Polyethylene glycol | 3 |
| Acetic acid (50%) | 2 |
| Water | 42 |
| Indarca A./BV (8% aqueous solution) | 50 |
| | 100 |

The paste was applied to each of the above-mentioned previously refined mix-spun fiber fabrics on a screen print-

| Dye No. | Starting material dyestuff | Type of metal | Shade of dyed material |
|---|---|---|---|
| 1 | [structure: HO—(CH₃-phenyl)—C(=)—(CH₃-phenyl)=O, with NaOOC and COONa substituents, central C bonded to dichlorophenyl group] | Cr | Blue. |
| 2 | $O_2N$—⟨phenyl⟩—N=N—⟨phenyl(COOH)⟩—OH | Cr | Yellow. |
| 3 | ⟨phenyl(CH₃)(NO₂)⟩—N=N—⟨phenyl(CHNOH)⟩—OH | Cr | Orange yellow. |

Dyeing Example 3

This example illustrates printing of fabrics of the following mix-spun fibers.

(1) Mix-spun fiber broadcloth : polypropylene-cotton (50:50).
(2) Mix-spun fiber broadcloth : polyester-cotton (65:35).
(3) Mix-spun fiber cloth : copolymer (60% vinyl chloride, 40% acrylonitrile)-cotton.

ing machine and, after drying, the fabric was padded with an aqueous solution containing 0.2% of soda ash and 20% of crystalline Glauber's salt at room temperature, and then steamed at 100° C. for 5 minutes, at the end of which time the fabric was washed with water, subjected to soaping with an aqueous solution containing 0.3% of soap and 0.2% of soda ash at 60° C. for 10 minutes, washed with hot water, and washed again with water. The fabrics were found to have been colored uniformly and to be excellent in wet color-fastness and fastness to both sublimation and dry cleaning.

| Dye No. | Starting material dyestuff | Type of metal | Shade of dyed material |
|---|---|---|---|
| 1 | [structure: HO—(CH₃-phenyl)—C(=)—(CH₃-phenyl)=O, with HOOC and COOH substituents, central C bonded to dichlorophenyl group] | Cr | Blue. |
| 2 | HO—⟨phenyl(COOH)⟩—N=N—⟨phenyl(COOH)⟩—OH | Cr | Yellow. |
| 3 | HO—⟨phenyl(HOOC)⟩—C(=)—⟨phenyl(COOH)⟩=O, central C bonded to phenyl | Cr | Green. |
| 4 | ⟨phenyl(NO₂)⟩—N=N—⟨phenyl(CHNOH)⟩—OH | Cr | Yellow. |

Dyeing Example 4

This example illustrates dyeing of glass.

In a solution of 0.5 part of each of the following dyestuff in 100 parts of water was immersed a sample of glass fiber. The fiber was squeezed, dried, and heat treated at 140° C. for 3 minutes. The colored fiber was fast to hot water and washing.

| Dye No. | Starting material dyestuff | Type of metal | Shade of dyed material |
|---|---|---|---|
| 1 | HO–⌬–C(=⌬=O)(COONa)(⌬)–; NaOOC–⌬– | Cr | Green. |

Dyeing Example 5

This example illustrates dyeing of wool, silk, nylon and cotton.

In a dyeing bath containing a solution of 0.3 part of each of the following dyestuffs in 500 parts of water was immersed 10 parts of each of the above-mentioned fibers. The bath temperature was increased to and maintained at 80° C. for 1 hour. Cellulosic fibers and silk could be dyed satisfactorily even at room temperature and the dyed substrates had an excellent color fastness. An alcoholic solution of such a dyestuff could also be utilized with equal success.

| Dye No. | Starting material dyestuff | Type of metal | Shade of dyed substrate |
|---|---|---|---|
| 1 | HO–⌬(CHNOH)–N=N–⌬(OCH₃)–⌬(OCH₃)–N=N–⌬(CHNOH)–OH | Cr | Orange red. |
| 2 | HO–⌬(COOH)–N=N–⌬(COOH)–OH | Cr | Yellow. |
| 3 | HO–⌬(COOH)–N=N–⌬(COOH)–OH | Ti | Yellow. |

Dyeing Example 6

This example illustrates dyeing of animal hides and skins.

In a solution of 1 part of each of the following dyestuffs in 100 parts of methanol was immersed a sample of tanned bovin hide at room temperature for 2 minutes, at the end of which time the hide was dried in air. The dyed hide had a satisfactory fastness to friction and solvents. It was found that tanned hides could also be spray-colored.

| Dye No. | Starting material dyestuff | Type of metal | Shade of colored material |
|---|---|---|---|
| 1 | HO–⌬(CH₃)–C(Cl)(⌬–Cl)=⌬(CH₃)=O ; HOOC–, –COOH | Cr | Blue. |
| 2 | 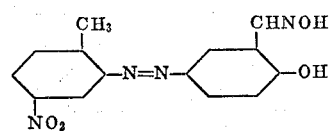 | Cr | Yellow. |

Having thus disclosed the invention, what is claimed is:

1. A water-soluble thermostable cationic complex metal compound of a member selected from the group consisting of the dyes of the formulae $$\text{HO}-\underset{\text{NO}_2}{\bigcirc}\text{-(CH}_3\text{)-N=N-}\bigcirc\text{-(CHNOH)-OH}$$

$$\underset{\text{NO}_2}{\bigcirc}\text{-N=N-}\bigcirc\text{-(CHNOH)-OH}$$

$$\underset{\text{Cl}}{\bigcirc}\text{-(OCH}_3\text{)-N=N-}\bigcirc\text{-(CHNOH)-OH}$$

$$\underset{\text{Cl}}{\bigcirc}\text{-(Cl)-N=N-}\bigcirc\text{-(CHNOH)-OH}$$

$$\bigcirc\text{-(CF}_3\text{)-N=N-}\bigcirc\text{-(CHNOH)-OH}$$

$$\text{HO-}\bigcirc\text{-(CHNOH)-N=N-}\bigcirc\text{-NH-}\bigcirc\text{-N=N-}\bigcirc\text{-(CHNOH)-OH}$$

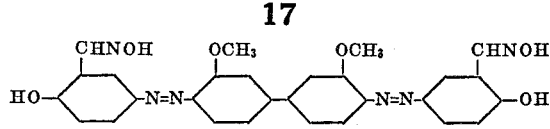

the metal being selected from the group consisting of trivalent chromium, tetravalent zirconium, trivalent titanium and tetravalent titanium, obtained by reacting the corresponding member of the said group, as starting dye, with from 1 to 4 moles, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH of below 4 at a temperature of 50° to 150° C. in an inert organic solvent which (a) is a solvent for the starting dye and for the resulting metal-containing compounds, (b) exhibits no alkalinity, and (c) is at least partially miscible with water.

2. The water-soluble thermostable cationic complex metal compound of the dye of the formula

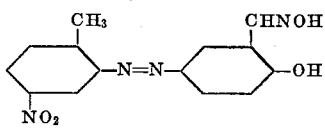

obtained by reacting 2 moles, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH of about 2 at a temperature of 50° to 150° C. in an inert organic solvent which (a) is a solvent for the starting dye and for the resulting metal-containing compound, (b) exhibits no alkalinity, and (c) is at least partially miscible with water.

3. The water-soluble thermostable cationic complex metal compound of the dye of the formula

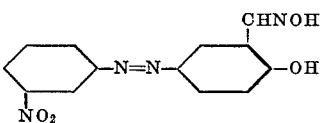

obtained by reacting 2 moles, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH of about 2 at a temperature of 50° to 150° C. in an inert organic solvent which (a) is a solvent for the starting dye and for the resulting metal-containing compound, (b) exhibits no alkalinity, and (c) is at least partially miscible with water.

4. The water-soluble thermostable cationic complex metal compound of the dye of the formula

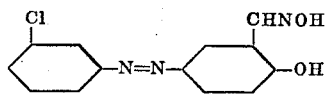

obtained by reacting 2 moles, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH of about 2 at a temperature of 50° to 150° C. in an inert organic solvent which (a) is a solvent for the starting dye and for the resulting metal-containing compound, (b) exhibits no alkalinity, and (c) is at least partially miscible with water.

5. The water-soluble thermostable cationic complex metal compound of the dye of the formula

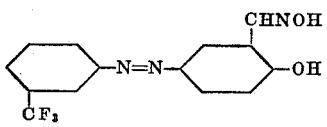

obtained by reacting 2 moles, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH of about 2 at a temperature of 50° to 150° C. in an inert organic solvent which (a) is a solvent for the starting dye and for the resulting metal-containing compound, (b) exhibits no alkalinity, and (c) is at least partially miscible with water.

6. The water-soluble thermostable cationic complex metal compound of the dye of the formula

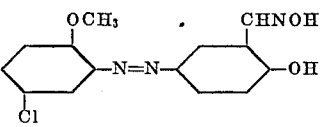

obtained by reacting 2 moles, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH of about 2 at a temperature of 50° to 150° C. in an inert organic solvent which (a) is a solvent for the starting dye and for the resulting metal-containing compound, (b) exhibits no alkalinity, and (c) is at least partially miscible with water.

7. The water-soluble thermostable cationic complex metal compound of the dye of the formula

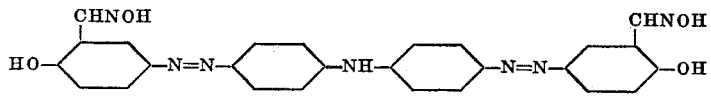

obtained by reacting 2 moles, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH of about 2 at a temperature of 50° to 150° C. in an inert organic solvent which (a) is a solvent for the starting dye and for the resulting metal-containing compound, (b) exhibits no alkalinity, and (c) is at least partially miscible with water.

8. The water-soluble thermostable cationic complex metal compound of the dye of the formula

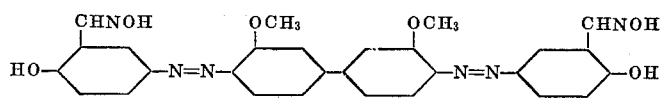

obtained by reacting 2 moles, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH of about 2 at a temperature of 50° to 150° C. in an inert organic solvent which (a) is a solvent for the starting dye and for the resulting metal-containing compound, (b) exhibits no alkalinity, and (c) is at least partially miscible with water.

References Cited

UNITED STATES PATENTS

| | | | |
|---|---|---|---|
| 2,120,799 | 6/1938 | Crossley et al. | 260—147 |
| 2,421,315 | 5/1947 | Carson | 260—147 |
| 2,492,959 | 1/1950 | Blumenthal | 260—148 XR |
| 2,626,255 | 1/1953 | Blumenthal | 260—148 XR |
| 2,690,438 | 9/1954 | Kracker | 260—149 XR |
| 2,726,238 | 12/1955 | Morschel et al. | 260—149 XR |

FOREIGN PATENTS

| | | |
|---|---|---|
| 585,141 | 10/1959 | Canada. |
| 470,356 | 8/1937 | Great Britain. |
| 1,122,461 | 5/1956 | France. |

OTHER REFERENCES

Brass et al.: C.A., vol 33, pp. 8187–8188 (1939).
Uemara et al.: C.A., vol. 36, p. 6807 (1942).

FLOYD D. HIGEL, *Primary Examiner.*